United States Patent
Bode

(10) Patent No.: US 11,465,525 B2
(45) Date of Patent: Oct. 11, 2022

(54) MEASURING APPARATUS AND METHOD FOR CAPTURING ELECTRICAL ENERGY TRANSFERRED FROM A CHARGING STATION

(71) Applicant: SIEMENS AKTIENGESELLSCHAFT, Munich (DE)

(72) Inventor: Sebastian Bode, Ahlen (DE)

(73) Assignee: Siemens Aktiengesellschaft, Munich (DE)

( * ) Notice: Subject to any disclaimer, the term of this patent is extended or adjusted under 35 U.S.C. 154(b) by 315 days.

(21) Appl. No.: 16/767,891

(22) PCT Filed: Oct. 12, 2018

(86) PCT No.: PCT/EP2018/077858
§ 371 (c)(1),
(2) Date: May 28, 2020

(87) PCT Pub. No.: WO2019/105641
PCT Pub. Date: Jun. 6, 2019

(65) Prior Publication Data
US 2020/0369172 A1    Nov. 26, 2020

(30) Foreign Application Priority Data
Nov. 28, 2017    (DE) .................... 10 2017 221 298.5

(51) Int. Cl.
*G01R 21/06*    (2006.01)
*B60L 53/62*    (2019.01)
(Continued)

(52) U.S. Cl.
CPC ............... *B60L 53/62* (2019.02); *B60L 53/18* (2019.02); *G01R 21/06* (2013.01); *G01R 21/14* (2013.01)

(58) Field of Classification Search
CPC ........ G01R 1/44; G01R 11/185; G01R 19/32; G01R 21/14
See application file for complete search history.

(56) References Cited

U.S. PATENT DOCUMENTS

| 2011/0320056 A1 | 12/2011 | Brown |
| 2012/0161797 A1 | 6/2012 | Hein |

(Continued)

FOREIGN PATENT DOCUMENTS

| DE | 102011089567 A1 | 6/2012 |
| DE | 102011013450 A1 | 9/2012 |
| EP | 2865558 A1 | 4/2015 |

OTHER PUBLICATIONS

International Search Report and the Written Opinion for International Patent Application PCT/EP2018/077858 dated Jan. 30, 2019.

*Primary Examiner* — Tung X Nguyen
(74) *Attorney, Agent, or Firm* — Lempia Summerfield Katz LLC

(57) ABSTRACT

The invention relates to means for a calibration standards-compliant determination of the electrical energy transferred from a charging station, which make a measurement at the transfer point, that is to say at the vehicle-side end of the charging cable, unnecessary. Here, the electrical energy transferred from a charging station is determined by a measurement of the energy before the transfer point, wherein the reactive power component from the termination point as far as the transfer point is compensated. The reactive power component is determined from at least one second electrical variable, for example a resistance of a conductor or a conductor shield, which is in a fixed relationship with an analog electrical variable that is relevant to the transferred electrical energy, for example an ohmic total resistance of at least two conductors involved in a charging circuit.

10 Claims, 1 Drawing Sheet

(51) Int. Cl.
  *B60L 53/18* (2019.01)
  *G01R 21/14* (2006.01)

(56) References Cited

U.S. PATENT DOCUMENTS

| | | |
|---|---|---|
| 2012/0253715 A1 | 10/2012 | Ohtomo |
| 2015/0346288 A1 | 12/2015 | Hardy |
| 2016/0368387 A1* | 12/2016 | Pavlovsky ............... B60L 53/12 |
| 2018/0335463 A1* | 11/2018 | Götz ..................... H02H 3/14 |

* cited by examiner

MEASURING APPARATUS AND METHOD FOR CAPTURING ELECTRICAL ENERGY TRANSFERRED FROM A CHARGING STATION

This application is the National Stage of International Application No. PCT/EP2018/077858, filed Oct. 12, 2018, which claims the benefit of German Patent Application No. 10 2017 221 298.5, filed Nov. 28, 2017. The entire contents of these documents are hereby incorporated herein by reference.

BACKGROUND

The present embodiments relate to capturing electrical energy transferred from a charging station.

Electric vehicles or vehicles at least partially driven with electrical energy have at least one rechargeable battery that is to be regularly charged during ongoing operation of the electric vehicle. The electric vehicle is charged at a charging station (e.g., electric vehicle supply equipment (EVSE)) that is connected to the electric vehicle via a charging cable.

A measuring apparatus provided in the charging station or assigned to the charging station is used to capture the electrical energy transferred from the charging station to the electric vehicle. This transferred electrical energy may be charged to the vehicle owner.

According to statutory calibration specifications, the transferred electrical energy may be measured at the transfer point (e.g., at the location at which the electrical energy is fed into the electric vehicle). However, energy is currently predominantly measured in a measuring apparatus of the charging station. However, the energy measured there also includes an energy component that is converted into thermal energy in a non-reactive resistance of the charging cable and is therefore not transferred as electrical energy at the transfer point. In the case of fast-charging operations with high charging powers that are strived for nowadays (e.g., high power charging), the energy component converted into thermal energy (e.g., thermal reactive energy) may well exceed 2% of the energy provided by the charging station.

On account of the conditions in the environment of a charging station, the transfer point is to be measured at the vehicle end of the charging cable (e.g., at the connector that is inserted into a corresponding socket on the vehicle). However, it is not practical to provide a measuring device at this location on account of, for example, size and weight restrictions of the connector.

A blanket consideration of the thermal reactive energy when charging for the electrical energy (e.g., by subtracting a percentage amount) is not permissible in statutory calibration since this subtraction would be based on a mere estimated value that is subject to fluctuations on account of technical conditions. Charging that is compliant with statutory calibration requires, for example, verifiable and indisputable proof of the electrical energy transferred at a transfer point.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an electrical energy transferred from a charging station is determined in a manner compliant with statutory calibration, which makes it unnecessary for a measurement at the transfer point, such as at the vehicle end of the charging cable.

A charging cable for forming an electrical connection between a connection point of the charging cable on the charging station and a transfer point of the charging cable on an energy sink (e.g., an electric vehicle) may be at least occasionally assigned to the measuring apparatus according to the present embodiments for capturing electrical energy transferred from a charging station. This charging cable includes a conductor set having a plurality of conductors. According to the present embodiments, the measuring apparatus includes two measuring units and a determination unit. A first measuring unit is configured to measure a first electrical power on at least two conductors at the connection point of the charging cable. In the case of an alternating single-phase charging current or in case of a direct current, the first electrical power is measured on two conductors and, in the case of a multi-phase charging current, is measured on at least three conductors of the charging cable. A second measuring unit is provided for measuring at least one second electrical variable at the connection point. A determination unit determines a reactive power component from the at least one second electrical variable, from which electrical energy transferred at the transfer point is determined based on the first electrical power compensated for by the reactive power component. The first measuring unit and the second measuring unit and the determination unit are optionally also combined in one or more units and may each or all be in the form of analog, digital, or hybrid units.

In this context, the terms "reactive power component" and "reactive power" may be electrical energy that is converted into thermal energy along the charging cable (e.g., "resistive transmission loss") and therefore is not available as electrical energy at the transfer point. In this description, a reactive power is not to be confused with the term known from AC technology, which, for setting up and removing electromagnetic fields via the AC network, may be understood as reactive power as opposed to an active power.

The measuring apparatus according to the present embodiments determines the electrical energy transferred from a charging station in a manner compliant with statutory calibration by measuring the energy before the transfer point. The reactive power component from the termination point to the transfer point is compensated for by the measuring apparatus.

For this purpose, the reactive power component is determined from at least one second electrical variable (e.g., a non-reactive resistance of a conductor or of a conductor shield) that is in a fixed relationship with respect to an analog electrical variable relevant to the transferred electrical energy (e.g., a non-reactive total resistance of at least two conductors involved in a charging circuit) or the analog electrical variable of which, for example, a respective voltage drop across the respective non-reactive resistance of the conductors involved in a charging circuit is used to compensate for intermediate measured values without determining the value of the second electrical variable.

In the first case, determination of a second electrical variable that is in a fixed relationship with respect to an analog electrical variable relevant to the transferred electrical energy, according to one configuration, the resistance of a conductor shield, which, for example, is in a fixed relationship with respect to the non-reactive resistance of the conductor involved in the charging circuit for a given charging cable length, may be captured. An advantage is that a resistance change on account of a temperature increase changes both the second electrical variable determined according to the present embodiments (e.g., the non-reactive resistance of the conductor shield) and the relevant analog electrical variable (e.g., the non-reactive total resistance of the conductors involved in the charging circuit) in the same manner, with the result that the reactive power component and finally the transferred electrical energy may be determined in a verifiable and indisputable manner from the second electrical variable in a manner that cannot be objected to in terms of statutory calibration.

In the second case, determination of a second electrical variable, the analog electrical variable of which is used to compensate for intermediate measured values without determining the value of the second electrical variable, according to one configuration, the resistance of a conductor shield that is, for example, in a fixed relationship with respect to the non-reactive resistance of the conductor involved in the charging circuit for a given charging cable length may be captured in order to add, in terms of circuitry, a respective voltage drop across the conductor involved in the charging circuit as an analog intermediate value. This results in the respective reactive power in the case of a charging current that is to be measured or is known. In this case, the analog electrical variable may not be captured as a value, but rather, may be integrated in the capture of the electrical energy transferred from the charging station in terms of circuitry or in an analog form, for example.

A further advantage according to the present embodiments is that replacement of the charging cable changes both the second electrical variable determined according to the present embodiments (e.g., the non-reactive resistance of the conductor shield or of another conductor) and the relevant analog electrical variable (e.g., the non-reactive total resistance of the conductors involved in the charging circuit) in the same manner. As a result, the reactive power component and the electrical energy transferred may also be determined in a verifiable and indisputable manner from the second electrical variable in a manner that cannot be objected to in terms of statutory calibration.

As a result of such mechanical coupling of the second electrical variable determined according to the present embodiments to the analog electrical variable used to compensate for the reactive power, manipulation may made difficult and may also be easily discernible.

In addition, a cable may be shortened during installation, a cable may be extended with further cables with possibly different conductor materials, or a cable may be replaced during repair.

The measuring apparatus according to the present embodiments also allows the distance between the connection point, the location of the measurement, and the transfer point, the location of the supply to the energy sink, to be selected to be considerably greater. Therefore, this allows the measuring apparatus to also be provided in a unit that is remote from the actual charging location (e.g., in a central unit supplying a plurality of charging posts). Such a central unit accommodates the devices of a charging station and is provided with a plurality of remote charging posts by connection cables. In comparison with a charging station, a charging post remote from the central unit then includes only the mechanism for handling the charging cable.

The provision of a remote central unit with charging posts connected thereto facilitates operation of the measuring apparatus within prescribed temperature limits since a plurality of measuring apparatuses may be installed in an air-conditioned housing of the central unit.

In addition, a respective installation space requirement of charging posts connected to a remote central unit is considerably reduced by providing the remote central unit. In addition, there is no need for an auxiliary power supply for such charging posts in the vicinity of the transfer point at least for operating a respective measuring apparatus that may be operated in the remote central unit.

On account of the various advantages of the present embodiments, a central unit for a plurality of charging posts enabling fast-charging operations with high charging power may be constructed and maintained in a considerably simpler and more cost-effective manner, for example.

According to one configuration, the at least one second electrical variable is measured on at least one conductor that does not correspond to any of the conductors provided for measuring the first electrical power (e.g., is not measured on the at least two conductors on which the first electrical power is measured). Even though, within the scope of the present embodiments, the second electrical variable may also be measured on the same conductors on which the first electrical variable is also measured, the measurement of the second electrical variable on different conductors of the charging cable according to this configuration provides advantages in many cases. Whereas a measurement of the second electrical variable on the same conductors may take into account that measurements of a particular second electrical variable (e.g., a measurement of the electrical resistance) may not be carried out during the charging operation and, therefore, may be carried out only before or after a charging operation or in a toggling manner during a charging operation, a continuous measurement on other conductors is possible. This configuration is therefore appropriate, for example, if the second electrical variable is intended to be determined continuously (e.g., during the charging operation).

According to an alternative configuration, the second electrical variable is measured at least partially on at least one conductor shield or on a charging cable shield (e.g., a shield braid that surrounds a conductor of the complete conductor set inside the charging cable). A two-pole measurement (e.g., of the resistance) is carried out either completely using two conductor shields (e.g., on one circuit to the energy sink and back on a conductor shield of another conductor) or partially (e.g., on one circuit to the energy sink and back on another conductor). In the case of a measurement of the non-reactive resistance as the second electrical variable, the measured non-reactive resistance is also in a particular previously known relationship with respect to that of the conductor, with the involvement of a conductor shield, which is reflected in a particular relationship of the cross sections when using the same conductive material. The relationship may be easily checked for manufactured lines but may be changed only with difficulty. In addition, a change in the electrical resistance (e.g., on account of a rising temperature of the charging cable during the charging operation) is effected both on the lines carrying the charging current and on the conductor shield. As a result, the reactive power component determined with the aid of the measured non-reactive resistance may be determined exactly.

An energy measurement includes, for example, a measurement of the electrical resistance of a conductor shield multiplied by the proportional relationship with respect to the electrical resistance of the charging current lines and multiplied by the square of an integral of a charging current measured in another manner. Alternatively, an equivalent voltage is applied to a conductor shield with respect to a ground potential, and the voltage at the second end of the conductor shield is set such that the current through the shield is again in a fixed relationship with respect to the measured current. This relationship is again determined by the cross-sectional relationship of the conductor and the shield. As a result of this, the second voltage represents the voltage at the transfer point. In this manner, the reactive power component may be determined from the voltage, the second electrical variable, without this being measured.

DETAILED DESCRIPTION

Figure 1:
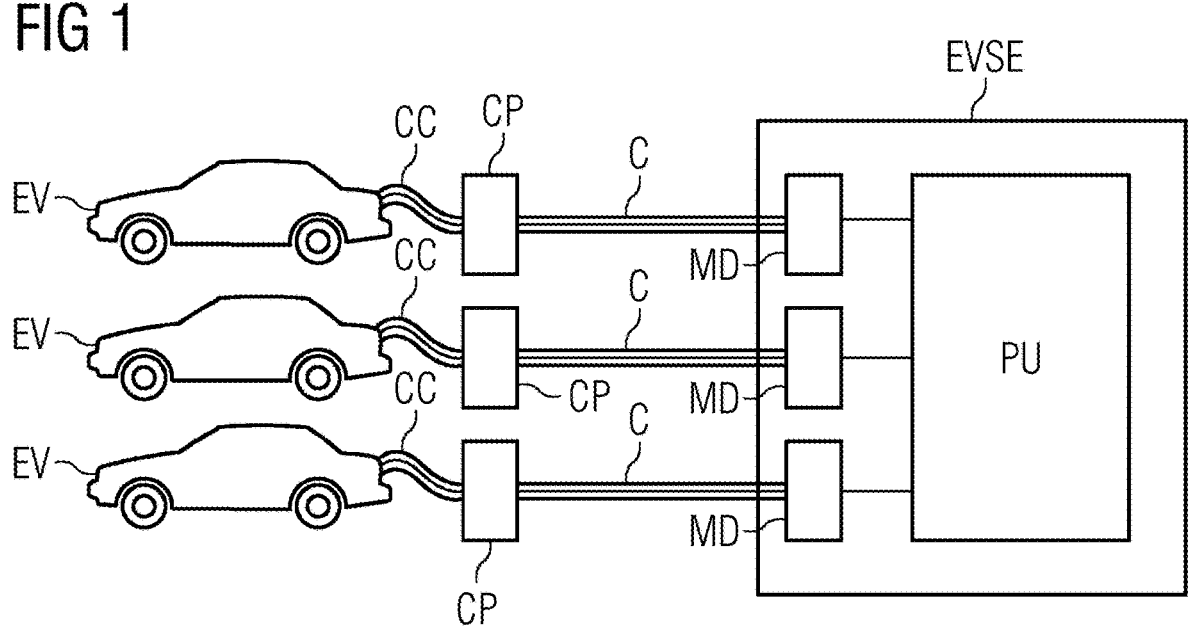
FIG. 1 illustrates a charging infrastructure in interaction with functional units according to an embodiment.

FIG. 1 shows a charging infrastructure with three electric vehicles EC that are connected to a charging post CP via a respective charging cable CC. The charging posts CP are each connected to a charging station EVSE using a connection cable C. The charging station EVSE contains an apparatus PU for the conventional provision, processing and control of an electrical charging current, which will not be discussed in any more detail. A respective measuring apparatus MD, to which the connection cable C is connected, is installed on three respective output lines of this apparatus PU.

This configuration of the present embodiments therefore relates to a constellation in which the charging station EVSE in the form of a central unit supplies a plurality of charging posts CP. The charging posts CP that are remote from the charging station EVSE then includes, apart from some display and control elements substantially only the mechanism for handling the charging cable CC, but not apparatuses for providing, processing, and controlling the electrical charging current that are provided in the apparatus PU of the central charging station EVSE.

This constellation makes it possible to select the distance between the connection point (e.g., the location of the measurement) and the transfer point (e.g., the location of the supply at the electric vehicle EV) to be considerably greater and therefore to also advantageously provide the measuring apparatus MD in the charging station EVSE remote from the actual charging location.

A conventional charging cable CC includes a cable set including a plurality of lines for respectively carrying the charging current (e.g., outer conductors or phase conductors, neutral conductors, protective conductors, etc.) and at least one signal line. In this case, a protective conductor in the cable set forms a return line for the signal line for safety reasons. The consistency of the device ground between the signal line and the electric vehicle is checked by the charging control device by measuring the current flow (e.g., the pilot signal) in the signal line. A current flow into the cable set and therefore charging of the rechargeable battery may be carried out only when the signal line circuit has been closed correctly.

The transfer point is defined as the location at which electrical energy is fed into the energy sink (e.g., electric vehicle EV). This transfer point corresponds to the vehicle end of the charging cable CC in the drawing.

The connection point is defined as the location at which electrical energy for operating or charging the energy sink (e.g., electric vehicle EV) is removed. In the drawing, this connection point corresponds to the connection of the connection cable C of the charging station EVSE, at which the respective measurement by the respective measuring apparatus MD is also carried out.

Figure 2:
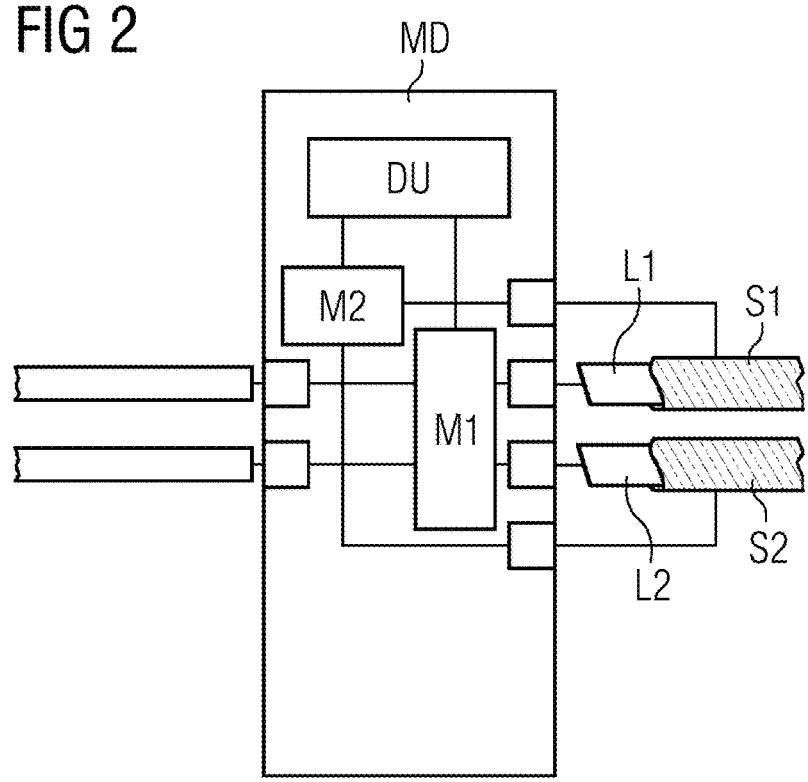
FIG. 2 illustrates a measuring apparatus according to one exemplary embodiment.

FIG. 2 shows a measuring apparatus MD according to one exemplary embodiment. The measuring apparatus MD includes a first measuring unit M1 (e.g., a sensor) for measuring a first electrical power on two conductors L1, L2 at the connection point, a second measuring unit (e.g., a sensor) for measuring at least one second electrical variable on the conductor shields of the two conductors L1, L2, and a determination unit DU (e.g., a processor) for determining a reactive power component from the second electrical variable and for determining the electrical energy transferred at the transfer point based on the first electrical power compensated for by the reactive power component.

The measuring unit M1 captures the first electrical power in a conventional manner by measuring the electrical voltage applied to the lines L1, L2 and the charging current.

Two internal lines with corresponding contacts, each without a reference sign, are illustrated on the left-hand side of the schematically illustrated measuring apparatus MD. These internal lines are used to connect the measuring apparatus MD to the apparatus PU inside the charging station EVSE.

According to the configuration of the present embodiments explained here, the second electrical variable is measured on the shield braid of the two conductor shields L1, L2. For this purpose, the two conductor shields L1, L2 are electrically connected to the inputs of the second measuring unit M2. In alternative variants, the second measuring unit M2 may be connected in any desired manner to other or further conductors or conductor shields (not illustrated) of the charging cable or to the charging cable shield itself.

A two-pole measurement (e.g., of a complex AC impedance) is carried out, via the first conductor shield L1, in a closed circuit to the energy sink, the electric vehicle EV (not illustrated), and back on a conductor shield S2 of the other conductor L2.

The circuit is closed in the electric vehicle by an electrical connection of the two conductor shields, a defined resistance, or a defined capacitance, in which case this defined resistance is taken into account in the measurement. In the case of an electrical connection, the circuit in the electric vehicle EV is closed via a common reference point or ground potential. In the case of a measurement of the non-reactive resistance or of the complex AC impedance with a determination of the non-reactive resistance as the second electrical variable, the measured or determined non-reactive resistance is in a particular previously known relationship with respect to that of the conductors L1, L2, which is reflected in a particular relationship of the cross sections when using the same conductive material.

The relationship may be easily checked for manufactured lines, but may be changed only with difficulty, which complies with the statutory calibration specification of verifiable and indisputable proof. The measurement results are logged for this purpose.

For example, on account of a rising temperature of the charging cable during the charging operation, continuous or cyclical collection of the second electrical variable will be necessary since the resistance of the conductors L1, L2 carrying the charging current in the charging cable and, with the charging current, the reactive power component likewise increase owing to the temperature.

However, this increase in the electrical resistance affects both the lines L1, L2 carrying the charging current and the conductor shield S1, S2, with the result that the reactive power component determined with the aid of the measured non-reactive resistance may still be determined exactly.

Instead of determining the second electrical variable and the reactive power component that may be determined therefrom in terms of values, the transferred electrical energy may be determined based on the first electrical power compensated for by the reactive power component (e.g., the electrical power to be charged for) also by compensating for the first electrical power measurement. For this purpose, the second measuring unit M2 applies an equivalent voltage to one of the two conductor shields S1 with respect to a ground potential (not illustrated) and sets the voltage at the second end of the other conductor shield S2 such that the current through the conductor shields S1, S2 is in a fixed relationship with respect to the charging current measured by the first measuring unit M1. As a result of this, the voltage set at the end of the second conductor shield S2 represents the voltage at the transfer point. This makes it possible to determine the reactive power component from the voltage, the second electrical variable, without this being measured.

In summary, the present embodiments provide a way for determining the electrical energy transferred from a charging station in a manner compliant with statutory calibration, which provides that it is unnecessary for a measurement at the transfer point (e.g., at the vehicle end of the charging cable). In this case, the electrical energy transferred from a charging station is determined by measuring the energy before the transfer point, in which case the reactive power component from the termination point to the transfer point is compensated for. The reactive power component is determined from at least one second electrical variable (e.g., a resistance of a conductor or of a conductor shield) that is in a fixed relationship with respect to an analog electrical variable relevant to the transferred electrical energy (e.g., a non-reactive total resistance of at least two conductors involved in a charging circuit).

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A measuring apparatus for capturing electrical energy transferred from a charging station, wherein a charging cable for forming an electrical connection between a connection point of the charging cable on the charging station and a transfer point of the charging cable on an energy sink is at least sometimes assignable to the charging station, and wherein the charging cable comprises a conductor set having a plurality of conductors, wherein the measuring apparatus comprises:

a first measuring unit operable to measure a first electrical power on at least two conductors of the plurality of conductors at the connection point;
a second measuring unit operable to measure at least one second electrical variable at the connection point; and
a determination unit configured to:
    determine a reactive power component from the at least one second electrical variable; and
    determine the electrical energy transferred at the transfer point based on the first electrical power compensated for by the reactive power component.

2. The measuring apparatus of claim 1, wherein the at least one second electrical variable is measured on at least one conductor of the plurality of conductors of the charging cable that does not correspond to any conductors of the plurality of conductors provided for measuring the first electrical power.

3. The measuring apparatus of claim 1, wherein the second electrical variable is measured on at least one conductor shield.

4. The measuring apparatus of claim 1, wherein the measurement of the second electrical variable comprises a measurement of an electrical resistance, an electrical voltage measurement, an electrical current measurement, a measurement of electrical energy at the connection point, or any combination thereof.

5. A method for capturing electrical energy transferred from a charging station, wherein a charging cable for forming an electrical connection between a connection point of the charging cable on the charging station and a transfer point of the charging cable on an energy sink is at least sometimes assignable to the charging station, and wherein the charging cable comprises a conductor set having a plurality of conductors, the method comprising:

measuring a first electrical power on at least two conductors of the plurality of conductors at the connection point;
measuring at least one second electrical variable at the connection point; and
determining a reactive power component from the at least one second electrical variable; and
determining the electrical energy transferred at the transfer point based on the first electrical power compensated for by the reactive power component.

6. The method of claim 5, wherein the second electrical variable is measured on at least one conductor of the plurality of conductors of the charging cable that does not correspond to any conductors of the plurality of conductors provided for measuring the first electrical power.

7. The method of claim 5, wherein the second electrical variable is measured on at least one conductor shield.

8. The method of claim 5, wherein the measurement of the second electrical variable comprises a measurement of an electrical resistance, an electrical voltage measurement, an electrical current measurement, or a measurement of electrical energy at the connection point, or any combination thereof.

9. The method of claim 5, wherein the at least one second electrical variable is measured continuously.

10. The method of claim 9, wherein the at least one second electrical variable is measured cyclically, at adjustable intervals of time, or cyclically and at adjustable intervals of time.

* * * * *